United States Patent [19]
Guillon

[11] Patent Number: 5,634,644
[45] Date of Patent: Jun. 3, 1997

[54] GASKET BASED ON ELASTOMER, PLASTIC, OR LIKE MATERIAL, A METHOD OF MANUFACTURING SUCH A GASKET, AND A METHOD OF MOUNTING IT ON A SUPPORT

[75] Inventor: Henri Guillon, Saint-Maurice-Sur-Fessard, France

[73] Assignee: Hutchinson, Paris, France

[21] Appl. No.: 363,419

[22] Filed: Dec. 23, 1994

Related U.S. Application Data

[62] Division of Ser. No. 116,485, Sep. 3, 1993, abandoned, which is a division of Ser. No. 771,134, Oct. 3, 1991, abandoned.

[30] Foreign Application Priority Data

Oct. 4, 1990 [FR] France .................................. 90 12241

[51] Int. Cl.⁶ .............................. B60J 10/02; E06B 3/56; F16J 15/10
[52] U.S. Cl. ........................... 277/186; 277/227; 49/492.1; 49/493.1
[58] Field of Search ..................... 277/182, 189, 277/186, 184, 227; 49/492.1, 493.1, 495.1; 296/146.9

[56] References Cited

U.S. PATENT DOCUMENTS

| | | |
|---|---|---|
| 2,184,186 | 12/1939 | Geyer . |
| 3,378,957 | 4/1968 | Frehse ..................... 49/492.1 |
| 3,562,957 | 2/1971 | Landis ..................... 49/493.1 |
| 3,737,972 | 6/1973 | Smoot . |
| 4,617,759 | 10/1986 | Pasqualini et al. ............. 49/492.1 |
| 4,783,117 | 11/1988 | Nagata . |
| 4,795,388 | 1/1989 | Coliandris et al. . |
| 4,874,201 | 10/1989 | Scaglietti ................... 296/146.9 |
| 4,891,913 | 1/1990 | Shimura et al. .............. 49/493.1 |
| 4,916,864 | 4/1990 | Thompson . |

FOREIGN PATENT DOCUMENTS

| | | |
|---|---|---|
| 377376 | 7/1990 | European Pat. Off. . |
| 2159100 | 5/1973 | Germany . |
| 173619 | 10/1983 | Japan . |
| 1174292 | 8/1985 | U.S.S.R. . |
| 1577312 | 10/1980 | United Kingdom . |

*Primary Examiner*—Scott Cummings
*Attorney, Agent, or Firm*—Lackenbach Siegel Marzullo Aronson And Greenspan, P.C.

[57] ABSTRACT

A constant section gasket based on elastomer, plastic, or like material, the gasket comprising a constant section element that is extruded or molded in at least one material selected from elastomers, plastics, thermoplastic elastomers, and the like materials. The gasket also includes a sole-piece for fixing on a support(s), in particular a metal part of car bodywork, with the sole-piece being fixed thereto by means of an induction heating machine.

7 Claims, 1 Drawing Sheet

GASKET BASED ON ELASTOMER, PLASTIC, OR LIKE MATERIAL, A METHOD OF MANUFACTURING SUCH A GASKET, AND A METHOD OF MOUNTING IT ON A SUPPORT

This is a division of application Ser. No. 08/116,485, filed Sep. 3, 1993 now abandoned; which in turn is a division of 07/771,134; filed Oct. 3, 1991, now abandoned.

The invention relates to a gasket based on elastomer, plastic, or like material, to a method of manufacturing it, and to a method of mounting it on a support.

BACKGROUND OF THE INVENTION

The invention applies particularly, but not exclusively, to gaskets based on natural or synthetic rubber(s) used singly or in various different blends, or to gaskets based on plastics, or on thermoplastic elastomers, or on like materials, and use of the invention is particularly advantageous in the field of gaskets obtained by extrusion or coextrusion of their constituent material(s), and mainly in the field of sealing gaskets and/or outside protection gaskets fitted to cars and also to other transport vehicles. In this field, the gaskets that are used generally comprise a channel section portion enclosing a reinforcing member and fitted with clips suitable for co-operating with studs or rivets of the hollow type known under the name KSM and previously fixed to the part of the bodywork which is to receive the gasket. Given that the rivets are put into place by robots end that sealing gaskets in particular require to be curved and shaped prior to being fitted with their rivet-fixing clips, it often happens that assembly is not entirely satisfactory when the positioning of the clips and the rivets does not coincide accurately. In addition, performing such an assembly method is relatively lengthy without there being any guarantee that the gasket of constant section will be fixed satisfactorily on its support.

Given that manufacturers seek to reduce manufacturing costs as much as possible as well as manufacturing time, while nevertheless ensuring that the resulting products are of good quality, the problem arises of providing a gasket based on elastomer, plastic, or like material, and of providing a method of mounting such a gasket on a support while avoiding the above-mentioned drawbacks of the known prior art.

Consequently, a general object of the present invention is to provide a gasket based on elastomer, plastic, or like material, a method of manufacturing it, and a method of mounting it on a support, all of which provide solutions to the problem posed.

Another object of the invention is to provide such a gasket which is suitable for being manufactured by the usual extrusion or molding techniques.

It is also an object of the invention to provide a method of manufacturing the gasket and a method of mounting it on a support which are simple and cheap to implement even when such mounting is applied to supports and/or gaskets that are complex in shape.

SUMMARY OF THE INVENTION

The present invention provides a gasket based on elastomer, plastic, or like material, the gasket comprising a constant section element that is extruded or molded in at least one material selected from elastomers, plastics, thermoplastic elastomers (TPE), end like materials, wherein the gasket includes a sole-piece for fixing on a support(s), in particular a metal part of car bodywork, with the sole-piece being fixed thereto by means of an induction heating machine.

In a first embodiment, the sole-piece is extruded or molded and it co-operates with the constant section element based on elastomer, plastic, or like material, by complementary shapes.

In a particularly advantageous embodiment, the sole-piece is made of a plastic or a thermoplastic elastomer such as those sold under the trade name Pebax (a trademark filed by Atochem).

In another embodiment, the sole-piece is made of a "hot melt" type material that melts on heating, or of a kind of body compound, or of a hot-setting glue.

In a first implementation, a method of manufacturing a gasket of the invention then consists firstly in producing the sole-piece by molding or by extrusion, in storing said sole-piece on a reel, end after cooling of the constant section element based on elastomer, plastic, or like material, likewise manufactured by extrusion, in assembling the sole-piece and said element by their complementary shapes, advantageously by continuously snapping together the corresponding portions of said element and of the sole-piece.

A gasket obtained in this way can then be cut up continuously into pieces of predetermined length suitable for being handled without the sole-piece sliding relative to the constant section element, and without it being possible for these two parts to come apart unless a special force is applied in this direction.

To mount a gasket of the invention on a support designed to receive the gasket, e.g. a metal part of car bodywork, a piece of gasket cut to a predetermined length is shaped, is brought into contact with the said part, and is then fixed thereto by melting and gluing the sole-piece by means of an electrode shaped to obtain induction heating of said part.

BRIEF DESCRIPTION OF THE DRAWING

Embodiments of the invention are described by way of example with reference to the accompanying drawing, in which.

DETAILED DESCRIPTION

Figure 1:
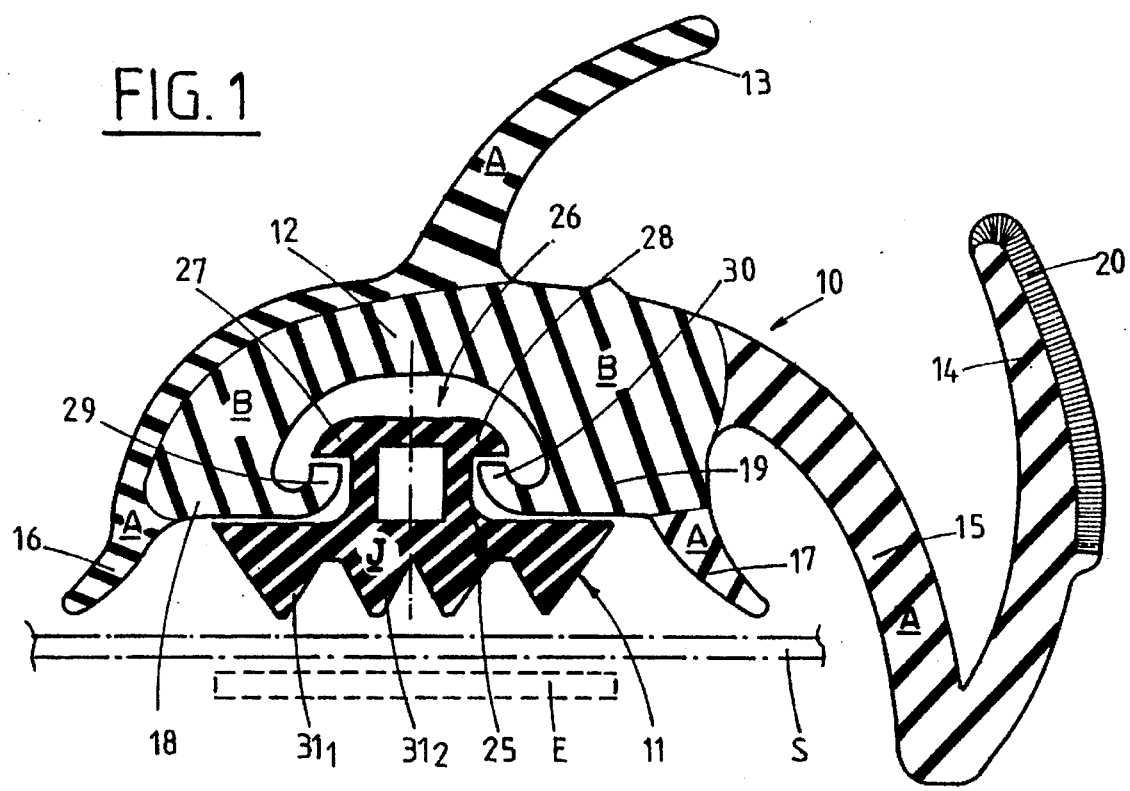
FIG. 1 is a section view through a first embodiment of a gasket of the invention.

Reference is made initially to FIG. 1 which shows a first embodiment of a constant section gasket J of the invention based on elastomer(s), thermoplastic elastomer(s) (TPE), plastic, or like material. The gasket is designed to be mounted on a motor vehicle body to provide sealing between said body and a door of the vehicle, with the gasket J resulting from interconnecting two constant section portions 10 and 11. The first portion 10 constitutes the gasket per se and comprises a body 12 having a right cross-section that is somewhat C-shaped and that is made of an elastomer type material such as a rubber or a blend of rubbers and whose hardness as indicated by the letter B may be about 50 on the Shore D scale. Integral with the body 12 there are:

a lip 13;

a sealing lip 14 having a coating 20 on its outside face of flock or of material having good sliding properties, and which is connected to the body 12 via one of the arms 15 of a V-shape; and two small lips 16 and 17 formed approximately at the ends of respective flanges 18 and 19 delimiting the C- or channel-shaped right cross-section.

As indicated by reference letter A, the lips 13, 14, 16, and 17, and also the arm 15, are made of an elastomer or a thermoplastic elastomer or a plastic that is compatible with that constituting the body 12 but is not so hard, e.g. having hardness of about 70 on the Shore A scale.

Also in accordance with the invention, the second portion 11 of the gasket J is a constant section member extruded or molded in plastic, or a thermoplastic elastomer or in like material, and it is suitable for being assembled to the portion 10 by complementary shapes. The second portion 11 constitutes a sole-piece 25 for fixing to a support S, e.g. a metal part of bodywork by applying induction heating to said part. As can clearly be seen in FIG. 1, the portion 11 comprises a beam 26 which is hollowed out to reduce the weight of substance required, and which has a right cross-section that is somewhat C-shaped so as to provide two rims 27 and 28 that serve to retain respective curved ends 29 and 30 of the flanges 18 and 19 of the body 12. The sole-piece 25 is connected to the web of the beam 26 and is striped to form teeth $31_1$, $31_2$, etc. which are considered an engaging portion.

To manufacture a constant section gasket J, in particular by implementing extrusion techniques, the portion 11 is manufactured first, e.g. out of a material of the type comprising thermoplastic elastomers such as those sold under the name Pebax (a trademark of Atochem), this portion is wound onto a reel for storage. Thereafter, or simultaneously, the portion 10 is manufactured and after it has cooled down it is fixed to the portion 11 by means of their complementary shapes, which is done most simply by slipping the beam 26 into the body 12, taking advantage of the resilient deformation of the ends 29 and 30 of the body 12.

Figure 2:
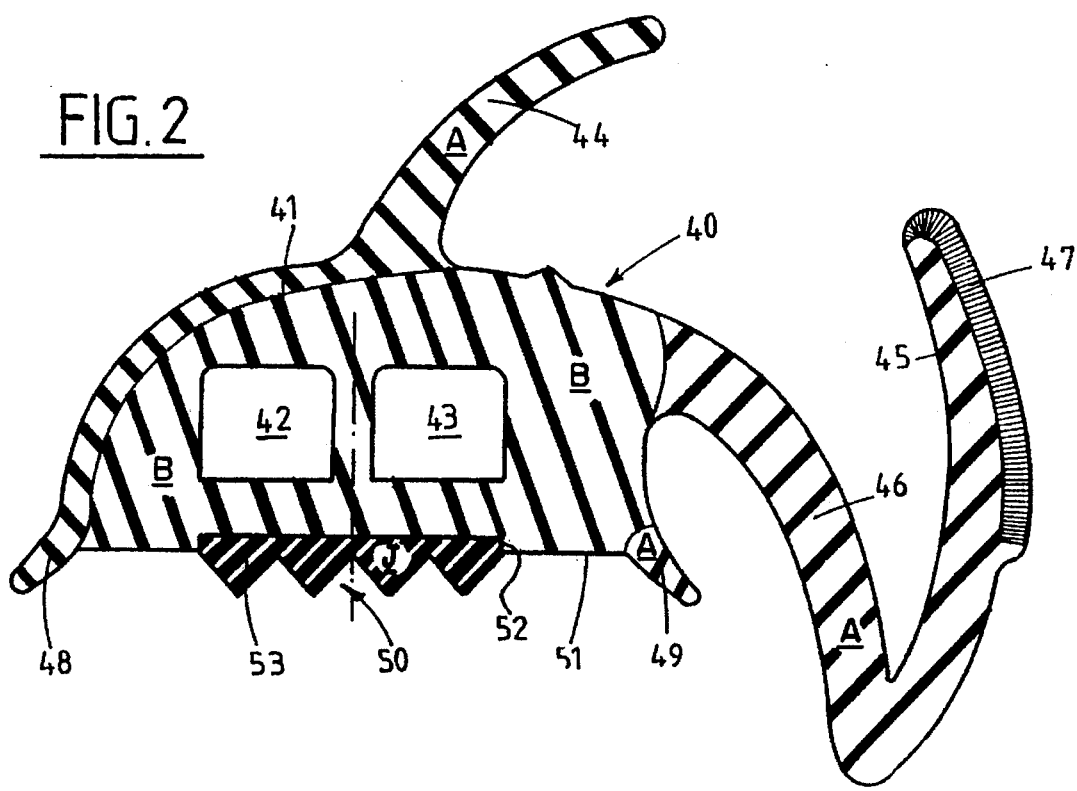
FIG. 2 is a section view through another embodiment.

In the embodiment of FIG. 2, the element 40 which corresponds to the element 10 in the above embodiment is obtained by extruding or molding one or more elastomer(s), thermoplastic elastomer(s) or like material(s). It comprises a body 41 hose right cross-section is somewhat rectangular with rounded corners and is hollowed out at 42 and 43, with lips 44 and 45, the lip 45 being connected to the body 41 via one arm 46 of a V-shape and having a coating 47 on its outside face analogous to the coating 20 of the above embodiment. The body 41 made of a material referenced B also has integral therewith two small lips 48 and 49 analogous to the lips 16 and 17 of the above embodiment, with the lips 44, 45, 48, and 49, and also the arm 46 all being made in this case likewise of material referenced A and having the same hardness as the material given the same reference in the embodiment shown in FIG. 1.

The constant section element 40 is associated, in accordance with the invention, with a sole-piece 50 having a sawtooth profile made of a material that melts on heating, such as "hot melt" type materials or a body compound type material or a material of the hot-setting glue type, and this material is applied to the face 51 of the element 40 in a groove 52 in the body 41, with the sole-piece 50 having stripes 53 being preferably applied to the element 40 after it has cooled down on leaving the extrusion machine, and while said element is being manufactured in this way.

Regardless of the particular embodiment, a gasket of the invention is fixed on a receiving portion of a support such as S, e.g. a part of car bodywork, by applying inductive heating. More precisely, after the gasket has been cut to a predetermined length, it is shaped and positioned on the receiving portion of a support S on which it is to be fitted: an electrode E connected to the generator of an induction heating machine, e.g. operating at about 100 kHz, is then approached to the assembly and the sole-piece 25 or 50 which is partially melted on contact with the heated metal part then serves to fix the gasket on the support by adhesion.

The method is easily automated by shaping the electrode E as a moving jaw of a robot which is also suitable, if necessary, for exerting pressure to press the gasket against the support S.

The method of the invention thus makes it possible to avoid installing clips on the gasket and rivets such as KSM rivets on the metal bodywork, thereby greatly reducing assembly time, with the join always being of good quality regardless of possible defects in the metal part since if such defects should exist, then they are filled in by the sole-piece 25 or 50.

Naturally, the method of the invention is not limited in any way to the application described by way of example. Thus, it can be implemented without alteration to mounting the window parts on vehicles, e.g. wind shields, in which case the metal support is constituted by the window mounting rabbet.

I claim:

1. A two-part constant section gasket assembly for an automobile comprising:

an elastic member having a constant section, made from at least one material selected from the group consisting of elastomers, plastics, and thermoplastic elastomers, a sole-piece formed by a beam having at least an outside portion and a fixing member with at least an engaging portion for fixing said gasket on a metal part of a car, said outside portion of said sole-piece and said elastic member having complementary shapes through which there are securely assembled together as a unitary one-piece assembly consisting of said elastic member and said sole-piece;

said fixing member being spaced from said elastic member and at least said fixing member being formed from a material selected from the group consisting of plastics and thermoplastics adapted to be fixed firmly on said support by the application of induction heating, and both said elastic member and said sole-piece being made from separate prior manufacturing steps selected from the group consisting of extrusion and molding.

2. The two-part constant section gasket assembly according to claim 1, wherein said complementary shaped outside portion of said sole-piece and said elastic member include means for their snap-fit assembly together so as to form a unitary one-piece assembly.

3. The two-part constant section gasket assembly according to claim 1, wherein said engaging portion of said sole-piece includes a saw tooth profile on a face thereof adapted to be fixed onto a part of said car.

4. The two-part constant section gasket assembly according to claim 2, wherein said engaging portion of said sole-piece includes a saw tooth profile on a face adapted to be fixed onto a part of said car.

5. A weatherstrip gasket assembly for an automobile, comprising:

a sole-piece formed by a beam and a fixing member made integral therewith, said fixing member having at least an engaging portion with a metallic automobile part, said beam having a substantially C-shaped outside portion and including a pair of rims extending outwardly in opposite directions from a longitudinal axis of said sole piece; an elastic element having an exterior part and an inner part, a plurality of sealing lips positioned on said exterior part, a cavity extending inwardly from said inner part in the direction of said exterior part, and said cavity having a configuration which is complementary to said substantially C-shaped outside portion of said beam, for receiving said C-shaped portion by means of a snap fit.

6. A weatherstrip gasket assembly for an automobile according to claim 5, wherein said engaging portion of said sole-piece comprises a plurality of teeth for engagement between said metallic automobile part and said sole-piece.

7. The two-part constant section gasket assembly according to claim 1, wherein said elastic member has a groove portion having a shape complementary to the outside portion of said sole-piece, and said elastic member and said sole-piece being securely assembled together by said groove portion and said outside portion of said sole-piece.

* * * * *